Figure 1:
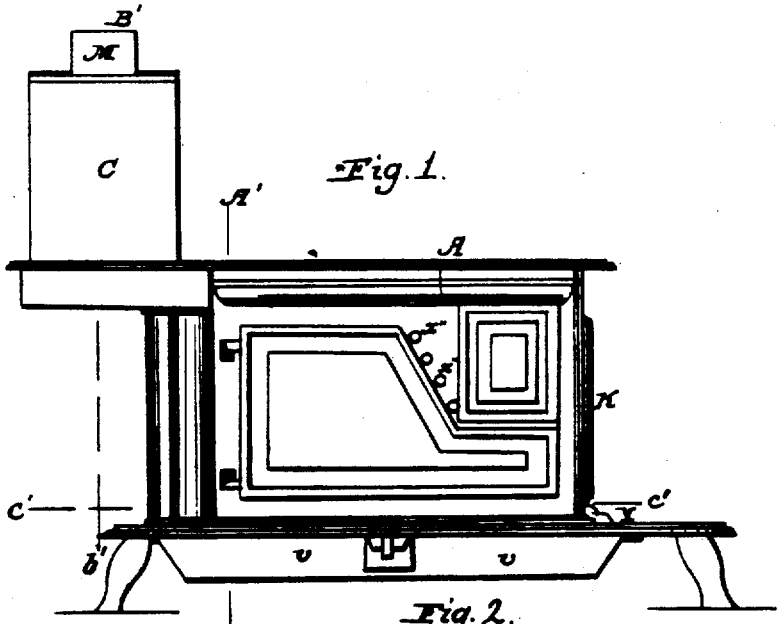

P. P. STEWART.

5 Sheets—Sheet 1.

Cooking Stove.

No. 3,453.

Reissued May 18, 1869.

Witnesses:

Inventor:

P. P. STEWART.

5 Sheets—Sheet 2.

Cooking Stove.

No. 3,453.

Reissued May 18, 1869.

Witnesses:

Inventor:

N. PETERS, Photo-Lithographer, Washington, D. C.

5. Sheets—Sheet 3.

P. P. STEWART.

Cooking Stove.

No. 3,453.

Reissued May 18, 1869.

Witnesses:
A. Schlunk
Jas. J. Maw

Inventor:
Elisa C. Stewart Legatee & Executrix
by Prindle & Dyer, Attorneys.

N. PETERS, Photo-Lithographer, Washington, D.C.

5 Sheets—Sheet 4.

P. P. STEWART.

Cooking Stove.

No. 3,453. Reissued May 18, 1869.

Witnesses:
A. Bedell
Daniel J. Moore

Inventor:
Silas C. Stewart Jr. Executor
by Prindle & Dyer Attorneys

N. PETERS, Photo-Lithographer, Washington, D.C.

5 Sheets—Sheet 5.
P. P. STEWART.
Cooking Stove.
No. 3,453.
Reissued May 18, 1869.
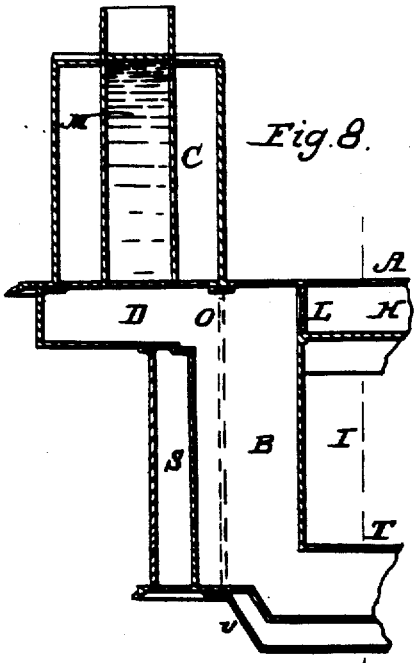
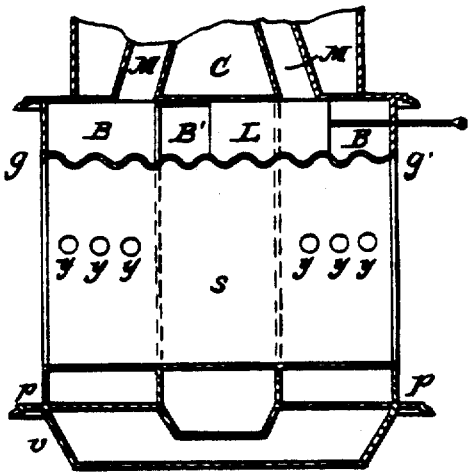
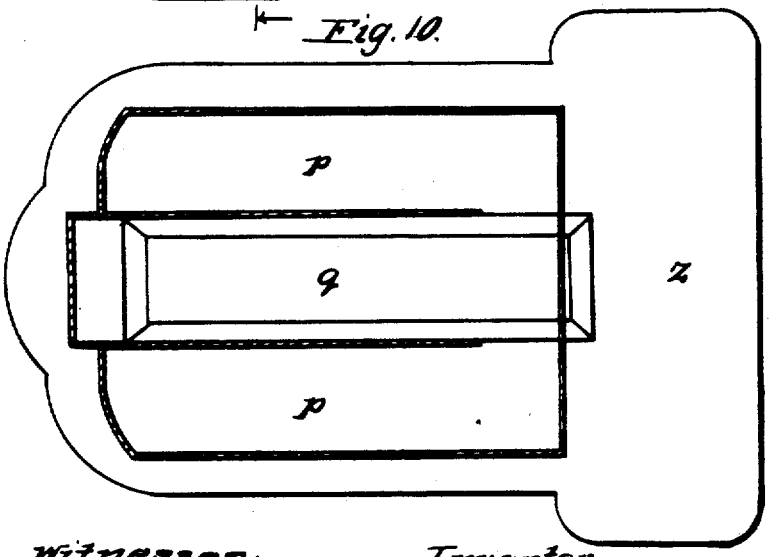
Witnesses:
C. A. Blunt
Frank J. Wise.
Inventor:
Silas C. Stewart Jr. Inventor
by Reindl & Byers Attorneys
N. PETERS, Photo-Lithographer, Washington, D. C.

UNITED STATES PATENT OFFICE.

ELIZA C. STEWART, OF TROY, NEW YORK, SOLE LEGATEE AND EXECUTRIX OF THE ESTATE OF PHILO P. STEWART, DECEASED.

IMPROVEMENT IN COOKING-STOVES.

Specification forming part of Letters Patent No. 22,681, dated January 18, 1859; Reissue No. 1,684, dated May 31, 1864; Reissue No. 3,041, dated July 14, 1868; Reissue No. 3,453, dated May 18, 1869.

*To all whom it may concern:*

Be it known that PHILO P. STEWART, deceased, late of the city of Troy, county of Rensselaer, and State of New York, did, on the 18th day of January, A. D. 1859, obtain of and from the United States of America certain Letters Patent for and upon new and useful Improvements in Cooking-Stoves, which said Letters Patent were duly surrendered and thereafter duly reissued, as provided by the law, bearing date the 31st of May, 1864, and were again surrendered and reissued in two divisions, numbered one and two, and bearing date of July 7th and 14th, respectively, and which said Reissued Letters Patent have been found to be defective, in that certain mistakes were made in the specifications and certain ambiguities exist in the claims thereof, by reason of which said specifications and claims do not cover and embrace all of the original invention and improvements contained in the drawings and models first and originally filed in the United States Patent Office—to wit, on the 17th day of August, 1855—which application, after being once rejected, was withdrawn, and a new application upon the same invention and improvements was duly filed, as by law made and provided—to wit, on the 20th day of October, 1858—each of which was in due form of law, but neither of which contained in the specifications and claims thereof the entire invention and improvements contained in the models and drawings originally made and filed in said Patent Office, as aforesaid. Now, therefore, I, ELIZA C. STEWART, sole legatee and sole executrix of the will of the aforesaid PHILO P. STEWART, deceased, being desirous to reissue the Letters Patent herewith surrendered (Division 2) in the manner and form as stated in the accompanying petition, have prepared specifications and drawings of the said original invention and improvements; and I do hereby declare that the following specification is a full, clear, exact, and more full description of that part of the said invention and improvements mentioned and contained in the claims hereto annexed, as well as of the construction, arrangement, and operation of the same, reference being had to the accompanying drawings, in which—

Figure 2:
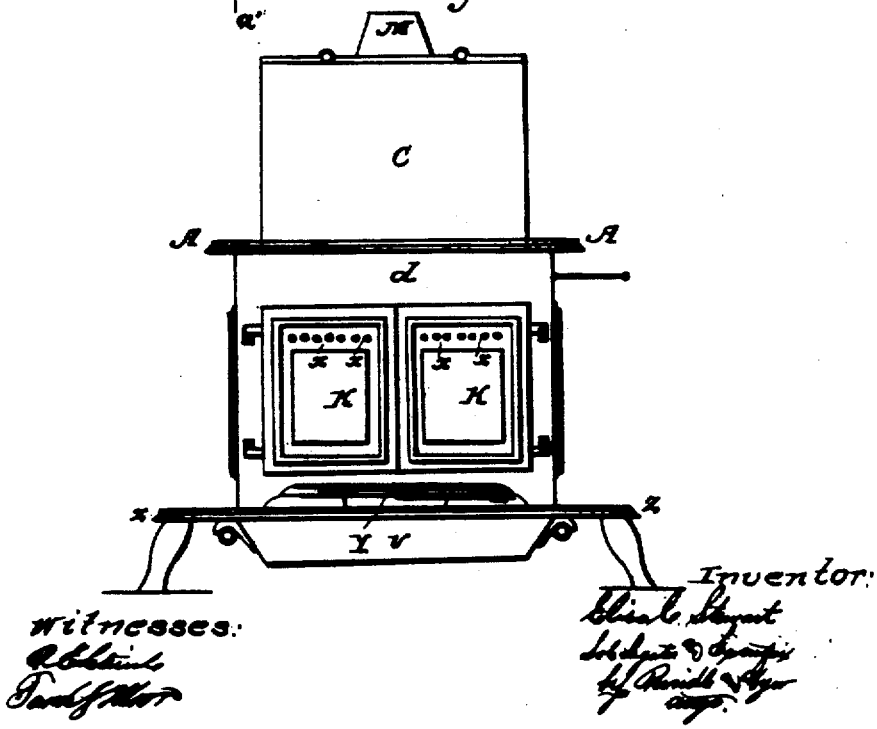
Figure 3:
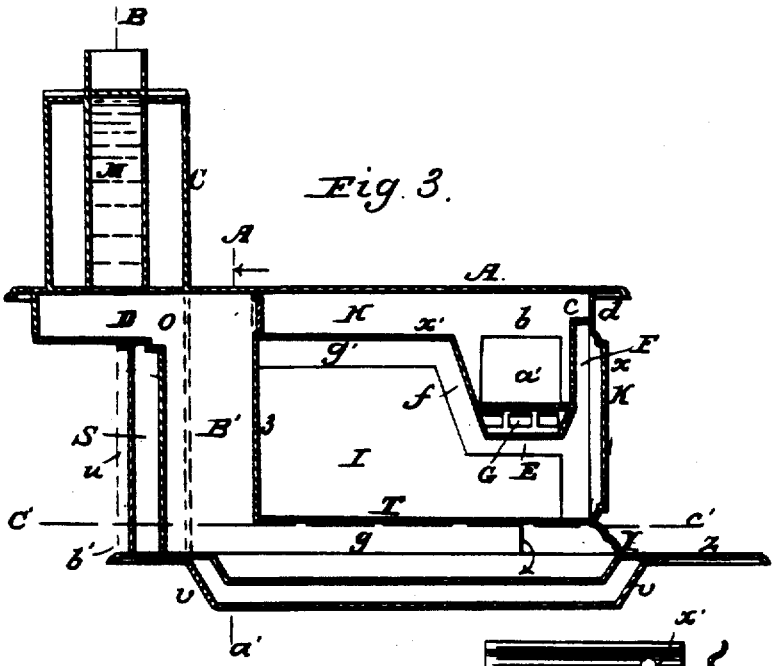
Figure 3:
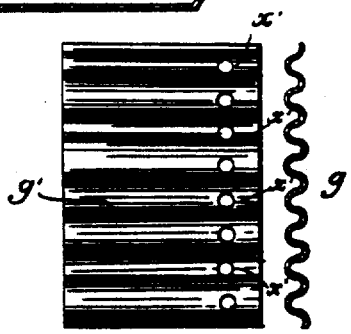
Figure 4:
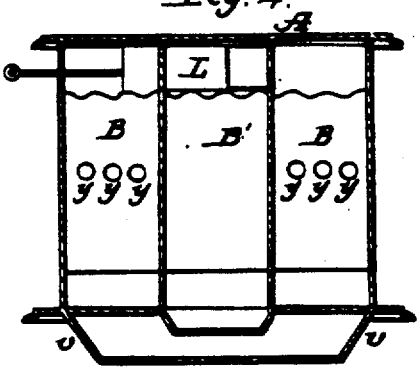
Figure 5:
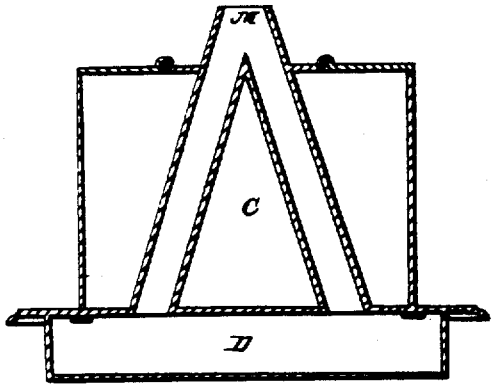
Figure 6:
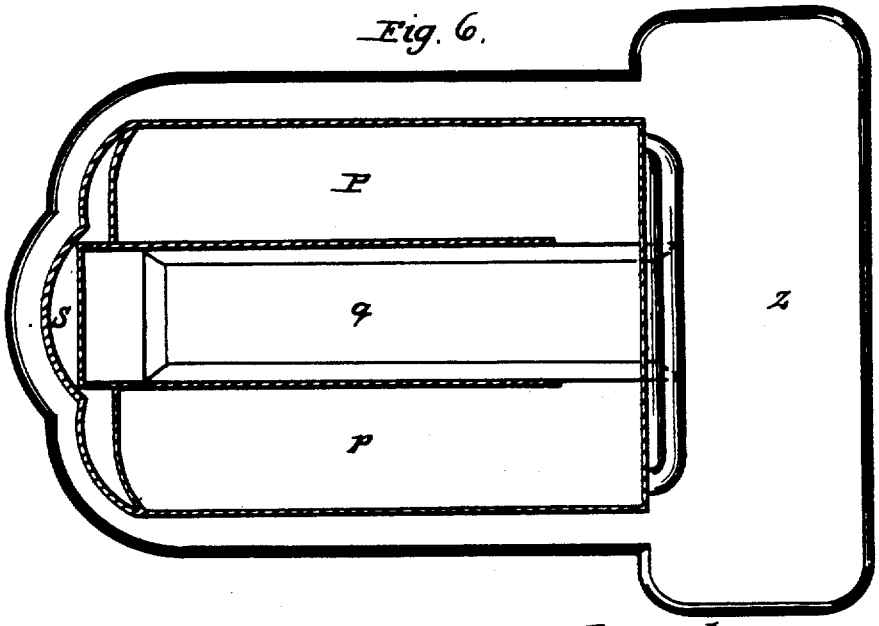
Figure 7:
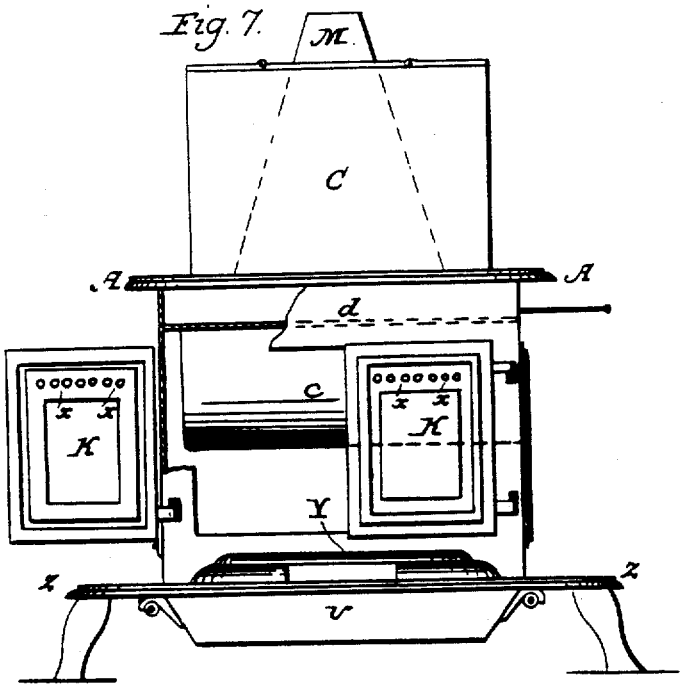
Figure 8:
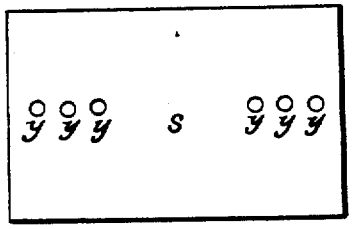

Figure 1 is a side elevation of a cooking-stove containing the invention hereinafter set forth in detail. Fig. 2 is a front elevation showing the front doors and apertures therein, and hereinafter described and set forth. Fig. 3 is a longitudinal vertical section, and showing the invention and improvements embraced in and covered by the claims hereto annexed. Figs. 4, 5, and 6 are sections taken at and on the lines $A^a$ $B^b$ $C^c$ of Fig. 1. Fig. 7 is a front elevation showing the front of the fire-box and the hot-air chamber or hot-air flue between the same and the front doors and communicating with the oven, which invention and improvements are described and contained in another specification, of even date herewith, and known as the first division or "Division A" of this application, upon which this specification is founded. Fig. 8 represents a rear end vertical section of the cooking-stove, containing a reservoir, with a chamber extending from the bottom plate of the stove to the under side or bottom of such reservoir or water-tank, and formed by an offset in the rear and vertical plate, or by the removing of a sufficient part or portion of said rear and vertical plate of such stove to form and complete such flue or chambers for admitting hot air or the heated escaping products of combustion to the bottom or under side of such reservoir, in order to heat the water therein, each and all of which is had, done, and performed in the manner substantially as hereinafter described and set forth. Fig. 9 is a cross vertical section on the dotted line shown at Fig. 10 of the same drawings, and it shows an opening in and through the rear vertical end plate of the cooking-stove, through and by means of which heat, hot air, or the heated escaping products of combustion are conveyed to the proper part or portion of the reservoir or water-tank for the purposes substantially as herein described and set forth. Fig. 10 represents the bottom part of the cooking-stove, just below and immediately underneath the oven, and also showing a cross view of the opening in and through the rear end vertical flue, through and by means of which heat or the heated escaping products of combustion are conducted to and into a chamber outside and beyond such rear vertical end plate of the stove, and under the bottom part of the reservoir or water-tank, for the purpose of warming or heating water therein, in the manner substantially as hereinafter described and set forth.

Letters of like name and kind refer to like parts in each of the figures of the accompanying drawings, of which there are five sheets, numbered from 1 to 5, respectively.

The matter of invention and improvement contained in the several Figs. 4, 6, 7, and 8 will be set forth and described in the specification of the first division hereof, as aforesaid.

The nature of the invention and improvements described and claimed in this specification consists in forming a flue over the oven of a cooking-stove such as is herein described, extending from the fire chamber over the upper ends of the descending and ascending flues and through the back plate thereof in such a manner as that the heat from the fire may be thrown against a reservoir placed upon the rear end of said stove for the purpose of heating water contained in said reservoir, and which heating is the more readily accomplished by one or more pipes passing through said reservoir connecting with a continuation of the flue first above-mentioned under the reservoir, through which flue and one or more pipes the heated escaping products of combustion are caused to pass.

It also consists of the arrangement of a damper within the flue or flues of said stove in such a manner as that the heated escaping products of combustion may, when said damper is open, be thrown directly against said reservoir, to heat the water therein contained, or when said damper is closed, that such heaed products of combustion may be caused to circulate through other parts of said stove, to heat the oven or for other purposes, and then caused to strike against said reservoir, and warm the water contained therein by the heat which would otherwise be wasted.

It also consists in constructing the rear vertical end of said stove with one or more suitable openings therein, so as to allow the heated escaping products of combustion to pass through and strike against a reservoir placed in the rear of said stove, as herein described.

It also consists in the construction of a suitable flue or chamber outside of the rear end of said stove and beneath the water-reservoir, into which shall pass through the opening in the rear vertical end of said stove, as above mentioned, the heated escaping products of combustion from the flues, thereby increasing the surface of said reservoir exposed to the heat thereof.

It also consists in arranging a reservoir or water-tank over or beyond the rear end of said stove, containing descending and ascending flues, and so held and secured in its place as that the heated products of combustion from the fire-chamber can, by means of the damper before mentioned, be thrown directly against said reservoir, or be thrown into other parts of the stove and then against the same.

Having thus fully described the nature and object of the said invention and improvements contained in this second division of my application for reissue of this patent, dated January 18, 1859, and reissued May, 1864, and again July, 1868, I will now proceed to describe the construction and operation of the same, which is as follows, to wit:

The cooking-stove is constructed in general substantially as described in the first division accompanying this specification and of even date herewith; but the invention and improvements herein described, set forth, and contained in the claims hereto annexed may be applied to any cooking-stove of usual construction and arrangement, as herein described and set forth.

In the annexed drawings, A represents the top plate of the stove, which covers the fire-chamber, and is provided with a suitable number of boiler-holes. The space between this top and the top plate of the oven forms a flue, H, extending from the fire-chamber *a* to the rear descending and ascending flues B′ and B of said stove. This top plate is extended over and beyond said descending and ascending flues B′ and B, beyond the rear end plate of said stove, so as to receive and support a reservoir or water-tank, C, Figs. 1, 2, and 3, or any equivalent therefor. Under this extension, or in or upon it, is formed, by means of additional plates or by casting the top or back so as to accomplish a like result, a chamber, D, over which the reservoir may rest. An opening, O, is made into said chamber D through the back of the stove, so as to allow the escaping products of combustion to pass into the same from the descending and ascending flues of the stove, as will be hereinafter more fully described. This chamber may be of any size deemed best, but the larger the surface of said reservoir exposed to the action of the escaping heated products of combustion the greater the percentage of the heat thus escaping will be utilized in heating the water contained therein. An opening is made into this chamber under the reservoir, so that the heat may strike directly against the part of said reservoir covering the opening; but the same result will be attained if there is no opening, provided that a means is employed for the exit of the heated products of combustion from this flue or chamber D, except that where said reservoir does not receive the direct action of said heated products of combustion the water is not heated so rapidly, and more heat is passed into the chimney and lost. The reservoir should fit said opening perfectly, and in order to make a more perfect joint a flange is provided which extends around the base of said reservoir.

In the stove, as herein described, the vertical descending and ascending flues B B and B′, at the rear end thereof are so constructed and the number such as that the heat shall pass down one or more, circulate under the oven, and then pass back up one or more to the reservoir. In combination with these flues is arranged a damper, L, which, when shut, closes the openings from the flue H into the rear ascending flues, and compels the heated products of combustion from the fire-chamber to pass down the descending flues, forward under the oven, and then back and up said ascending flue against the reservoir, and from thence out through the smoke-pipe into the chimney, thus heating the water in the reservoir with the heat remaining in said products of combustion after they have passed through said flues, around the oven and other parts of the stove, and which remaining heat would otherwise be useless and wasted. By thus having hot water always on hand without the use of additional fuel, much expense is saved and great convenience results. When it is desired to heat the water in the reservoir rapidly, the damper L may be opened and the heated products of combustion from the fuel-chamber will pass directly over the ascending flue and against the reservoir, instead of passing under and heating the oven.

The reservoir or water-tank C may be of any size or form and constructed of any material, and may be movable or be fastened to the stove, as may be desired. It is designed that the exit pipe or pipes should pass through said reservoir, as thereby more heat will be imparted to the water; but, if deemed preferable, said pipe or pipes may pass up in front or behind said reservoir, provided that all the parts are so arranged as that the heated escaping products of combustion may heat the water in said reservoir. It is preferable, however, to have the pipes pass through the reservoir substantially as herein set forth.

The reservoir, as arranged and combined with a cooking-stove having rear vertical ascending and descending flues, substantially as herein described, economizes largely in the use of fuel and also in the room about such stove, and also adds much to its convenience, furnishing hot water at all times when said stove is in operation, with no greater consumption of fuel than would be required without such reservoir.

The reservoir may rest entirely back of the descending and ascending rear flues; or it may rest partly over the same, having the front edge thereof over or on a line with the back oven-plate, in which event, said reservoir being over both the ascending and the descending flues, the heated products of combustion, in passing down the descending flues, will impart some of their heat to the reservoir before they have passed under the oven, thereby lessening the heat of the oven and detracting from the economy of the stove. It is therefore preferable to have the front edge of said reservoir on a line, or nearly so, with the back plate of the stove, so that it shall receive no heat until the gaseous products of combustion have given the needed heat to the other parts of the stove. It will be seen, however, that no mere change of the relative position or form of the parts will materially alter the nature of the invention, which will remain essentially the same.

The ascending flue B′ is situated between the back oven-plate and the back plate of the stove, the latter of which is provided with an offset, for the purpose of extending said flue horizontally, so as to cause the ascending heated products of combustion to strike more directly against the bottom of the reservoir.

The descending and ascending flues B B and B′, are inclosed or covered by means of an incasement, *u*, denominated an "extra back," made of tin or other suitable metal, and placed at a proper distance from the cast-iron plate forming the back plate of the said flues and the stove, and between which is left a space, S. The object of said extra back is to prevent the radiation of heat from said back stove-plate into the room; but as heat is radiated in direct lines, and is not absorbed in passing through the air, the distance at which said extra back is placed from the stove is not material.

The extra back will serve a threefold purpose—first, it will reflect the heat back into the stove, thereby adding to the economy of the stove; second, it will prevent the heat from being radiated into the room where the stove is used, making the room more comfortable in the summer; and, third, where it is placed at a sufficient distance from the back of the stove the space formed may be used for warming articles, &c.

Having thus described the nature, construction, and operation of the said invention contained in this division or specification, what I claim, and desire to secure by Letters Patent of the United States of America, is—

1. The employment and arrangement of the top plate of a cooking-stove extended over and beyond the rear end and upper portion of the descending and ascending flues, back of the oven thereof, in such manner as to receive and support a reservoir or water-tank upon or over a suitable opening therein, and with a heating chamber below or underneath the same, in the manner and for the purpose substantially as herein described and set forth.

2. The arrangement and employment of the heating-chamber D, or its equivalent, in combination with the rear ascending and descending flues of a cooking-stove, and with the reservoir or water-tank C, in the manner and for the purposes substantially as hereinbefore described and set forth.

3. The combination of the reservoir or water-tank C with the chambers D and S on the rear end of a cooking-stove having ascending and descending flues, in the manner and for the purposes substantially as herein described and set forth.

4. The arrangement and combination of the chamber S, or any equivalent thereof, upon or with the rear end of a cooking-stove containing ascending and descending flues, in the manner and for the purpose substantially as herein described and set forth.

5. The vertical end plate of a cooking-stove, containing the opening O, or any equivalent therefor, for the passage of hot air or the escaping heated products of combustion against the reservoir or water-tank, substantially as herein described and set forth.

6. The employment and arrangement of the damper L, or any equivalent therefor, within the flues of a cooking-stove, having a boiler or reservoir supported over or beyond the descending or ascending flues of said stove, so that the heated products of combustion may be either thrown against said reservoir and directly into the exit-flue, or may be caused to pass through other parts of said stove and then against said reservoir and into said exit-flue, for the purpose of heating the water contained in said reservoir, substantially as herein described and set forth.

7. The flue B′, constructed as described, in combination with the reservoir C, substantially as and for the purpose shown.

8. A reservoir or water-tank for the warming or heating of water therein, in combination with the descending and ascending rear flues of a cooking-stove, substantially as and for the purpose shown.

In testimony whereof I have, on this 17th day of April, 1869, hereto affixed my name in the presence of two witnesses.

ELIZA C. STEWART,
*Legatee and executrix.*

Witnesses:
BENJ. H. HALL,
JAMES S. HALL.